(12) United States Patent
Velusamy

(10) Patent No.: US 8,595,251 B2
(45) Date of Patent: Nov. 26, 2013

(54) FLEXIBLE INTERFACE MODULE

(75) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 13/297,636

(22) Filed: Nov. 16, 2011

(65) Prior Publication Data
US 2013/0124553 A1 May 16, 2013

(51) Int. Cl.
*G06F 17/30* (2006.01)

(52) U.S. Cl.
USPC ............. 707/759; 707/769; 707/E17.136; 707/E17.14

(58) Field of Classification Search
CPC .......... G06F 17/30864; G06F 17/30398; G06F 17/30595
USPC .......... 707/759, E17.136, E17.14, 769
See application file for complete search history.

(56) References Cited

U.S. PATENT DOCUMENTS

| | | | | |
|---|---|---|---|---|
| 5,632,013 | A * | 5/1997 | Krygowski et al. | 714/6.32 |
| 6,023,280 | A * | 2/2000 | Becker et al. | 345/440 |
| 6,134,564 | A * | 10/2000 | Listou | 715/236 |
| 6,397,206 | B1 * | 5/2002 | Hill et al. | 707/713 |
| 6,581,055 | B1 * | 6/2003 | Ziauddin et al. | 1/1 |
| 7,024,473 | B2 * | 4/2006 | Parent | 709/223 |
| 7,089,567 | B2 * | 8/2006 | Girardot et al. | 719/330 |
| 7,457,797 | B2 * | 11/2008 | Bestgen et al. | 1/1 |
| 7,533,103 | B2 * | 5/2009 | Brendle et al. | 1/1 |
| 7,685,568 | B2 * | 3/2010 | Brendle et al. | 717/120 |
| 7,711,742 | B2 * | 5/2010 | Bennett et al. | 707/759 |
| 7,913,262 | B2 * | 3/2011 | Brabson et al. | 719/315 |
| 8,074,234 | B2 * | 12/2011 | Tang et al. | 719/328 |
| 8,122,007 | B2 * | 2/2012 | Mayer et al. | 707/713 |
| 8,180,789 | B1 * | 5/2012 | Wasserman et al. | 707/766 |
| 8,306,979 | B2 * | 11/2012 | Mao et al. | 707/736 |
| 8,321,450 | B2 * | 11/2012 | Thatte et al. | 707/769 |
| 8,364,750 | B2 * | 1/2013 | Bolognese et al. | 709/203 |
| 8,387,076 | B2 * | 2/2013 | Thatte et al. | 719/328 |
| 2002/0016814 | A1 * | 2/2002 | Convent et al. | 709/203 |
| 2002/0143742 | A1 * | 10/2002 | Nonomura et al. | 707/1 |
| 2003/0023628 | A1 * | 1/2003 | Girardot et al. | 707/513 |
| 2004/0006570 | A1 * | 1/2004 | Gelb et al. | 707/102 |
| 2004/0073574 | A1 * | 4/2004 | Shimizu et al. | 707/104.1 |

(Continued)

OTHER PUBLICATIONS

SearchSOA.com, "Web services (application services)", Mar. 26, 2007, 1 pages, accessed online at <http://searchsoa.techtarget.com/definition/Web-services?vgnextfmt=print> on Apr. 2, 2013.*

(Continued)

*Primary Examiner* — Phuong Thao Cao

(57) ABSTRACT

An interface module for a local application provides a user interface to solicit user input for an configuring invocation. The user input solicited by the user interface includes a name of an external query to be executed and an input variable name for the external query. The interface module receives the user input for the configuring invocation; stores the invocation; and receives a trigger, with an input value for the external query, to launch the invocation. In response to receiving the trigger, the interface module executes the invocation to provide, to another interface module for a remote application, a request to execute the external query. The interface module receives, from the other interface module, an output value for the external query and process the output value.

20 Claims, 12 Drawing Sheets

(56) References Cited

U.S. PATENT DOCUMENTS

| | | | | |
|---|---|---|---|---|
| 2004/0215604 | A1* | 10/2004 | Ivanov | 707/3 |
| 2005/0021537 | A1* | 1/2005 | Brendle et al. | 707/100 |
| 2005/0021998 | A1* | 1/2005 | Fiedler et al. | 713/200 |
| 2005/0114763 | A1* | 5/2005 | Nonomura et al. | 715/513 |
| 2005/0131889 | A1* | 6/2005 | Bennett et al. | 707/4 |
| 2005/0149558 | A1* | 7/2005 | Zhuk | 707/104.1 |
| 2006/0074967 | A1* | 4/2006 | Shaburov | 707/102 |
| 2006/0112180 | A1* | 5/2006 | Vedula | 709/227 |
| 2006/0190480 | A1* | 8/2006 | Ori et al. | 707/103 R |
| 2006/0190498 | A1* | 8/2006 | Pruet | 707/202 |
| 2006/0224561 | A1* | 10/2006 | Bestgen et al. | 707/2 |
| 2007/0282856 | A1* | 12/2007 | Mueller et al. | 707/10 |
| 2007/0283367 | A1* | 12/2007 | Brabson et al. | 719/330 |
| 2008/0027735 | A1* | 1/2008 | Bruchlos et al. | 705/1 |
| 2008/0082965 | A1* | 4/2008 | Atkin et al. | 717/118 |
| 2008/0096656 | A1* | 4/2008 | LeMay et al. | 463/31 |
| 2009/0063493 | A1* | 3/2009 | Fukata et al. | 707/9 |
| 2009/0171895 | A1* | 7/2009 | Hackmann | 707/3 |
| 2009/0309570 | A1* | 12/2009 | Lehmann et al. | 323/318 |
| 2009/0319497 | A1* | 12/2009 | Bolognese et al. | 707/4 |
| 2010/0017368 | A1* | 1/2010 | Mao et al. | 707/3 |
| 2010/0131537 | A1* | 5/2010 | Mayer et al. | 707/759 |
| 2010/0199169 | A1* | 8/2010 | Gnech et al. | 715/234 |
| 2011/0022618 | A1* | 1/2011 | Thatte et al. | 707/769 |
| 2011/0023055 | A1* | 1/2011 | Thatte et al. | 719/328 |
| 2011/0113341 | A1* | 5/2011 | Liensberger et al. | 715/738 |
| 2011/0131229 | A1* | 6/2011 | Kubota et al. | 707/765 |
| 2011/0302499 | A1* | 12/2011 | Chou et al. | 715/738 |
| 2012/0078955 | A1* | 3/2012 | Boguraev et al. | 707/769 |
| 2012/0084319 | A1* | 4/2012 | Bansode et al. | 707/769 |
| 2012/0246173 | A1* | 9/2012 | Wittmer et al. | 707/749 |

OTHER PUBLICATIONS

Rich Rollman, "Creating a Web Service—Use SQLXML 3.0 to expose your stored procedures as Web services", SQL Server 2000, Copyright 2002, 4 pages, accessed online at <http://msdn.microsoft.com/en-us/library/aa224869(v=sql.80).aspx> on Apr. 2, 2013.*

Stack Overflow website, "PHP: Remote Function Call and returning the result?", Sep. 2011, 3 pages, accessed online at <http://stackoverflow.com/questions/7460577/php-remote-function-call-and-returning-the-result> on Apr. 2, 2013.*

Dokulil, et al., "Semantic Web Infrastructure", IEEE, International Conference on Semantic Computing, 2007, pp. 209-215.*

Chatel, et al., "QoS-based Late-Binding of Service Invocations in Adaptive Business Processes", IEEE International Conference on Web Services, 2010, pp. 227-234.*

* cited by examiner

FLEXIBLE INTERFACE MODULE

BACKGROUND

In many instances, applications may rely on information from other applications/systems to perform requested tasks. When developing software code to exchange information between dissimilar systems, software code must be created for both systems to process a request and provide a response from one system to another. This development process can be time-consuming and inefficient.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a software module that allows two systems to exchange data without a code change in one or both systems. The flexible interface module may run on each of the two systems. The flexible interface module may be capable of inter-module communication, which is abstracted from users (e.g., software developers). The users can write formatted queries using a user interface (e.g., a graphical user interface (GUI)) of a local flexible interface module and package multiple queries into an invocation. To exchange data, a user may communicate their invocation name, input and output parameters.

In one implementation, an interface module for a local application may provide a user interface to solicit user input for configuring an invocation. The user input solicited by the user interface may include a name of an external query to be executed and an input variable name for the external query. The interface module may receive the user input for configuring the invocation; store the invocation; and receive a trigger, with an input value for the external query, to launch the invocation. In response to receiving the trigger, the interface module may execute the invocation to provide, to another interface module for a remote application, a request to execute the external query. The other interface module may execute the external query (e.g., on the remote application) and may send an output value to the interface module for the local application. The interface module may receive the output value for the external query and process the output value (e.g., by executing a local query to integrate the output value into the local application).

As used herein the term "query" may refer to a command string that can be run to fetch results for variables and send the results back to the requestor. A query may be either internal or external. An internal query may be run locally (e.g., within a single application); while an external query may be run on an application separate (or remote) from the requesting application. As used herein the term "invocation" may refer to a collection of queries. Invocations can execute the collection of queries in a sequence. In some instances, the collection of queries may be included within one or more sub-invocations. Thus, an invocation can be comprised of queries, sub-invocations, or a combination of both. The queries/invocations within the collection can either be internal or external.

Figure 1:
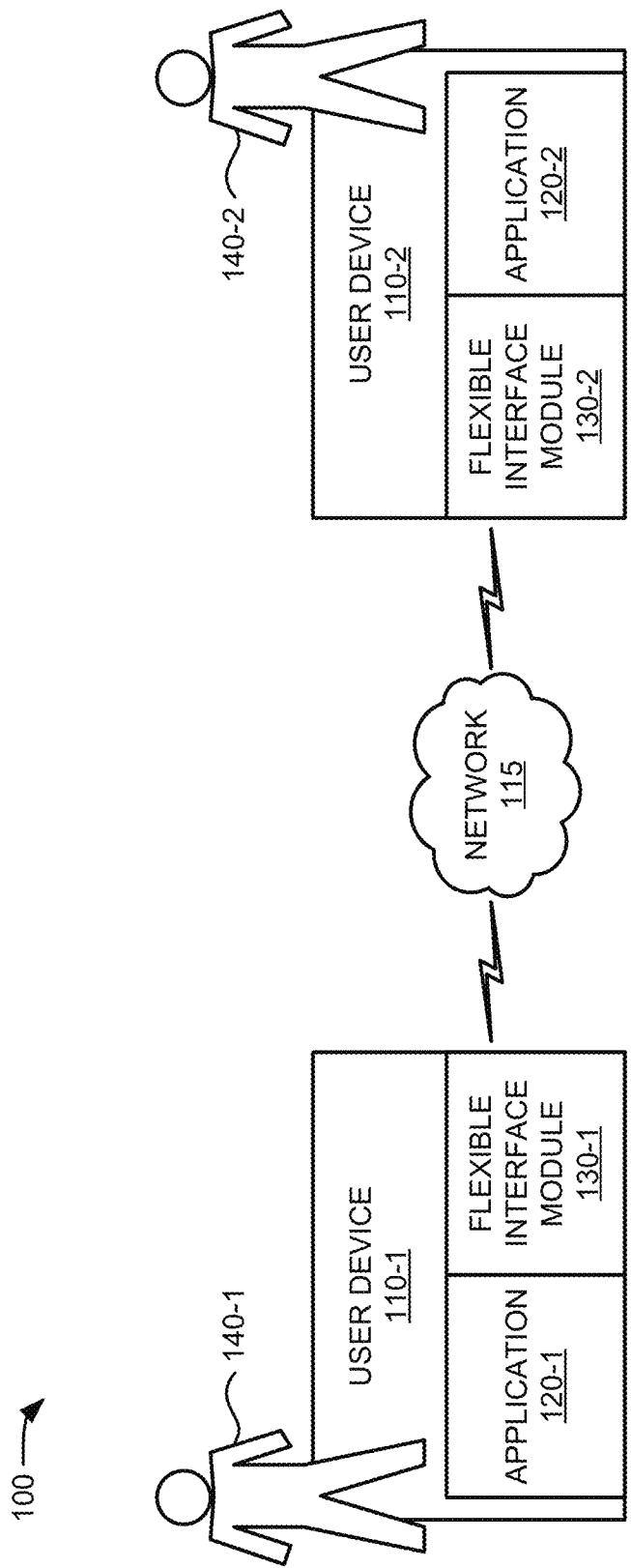
FIG. 1 illustrates concepts described herein.

FIG. 1 illustrates concepts described herein. As shown in FIG. 1, an environment 100 may include two user devices 110-1 and 110-2 (referred to herein collectively as "user devices 110" and generically as "user device 110") interconnected by a network 115. Each user device 110 may include an application (e.g., applications 120-1 and 120-2, respectively) and a flexible interface module (e.g., flexible interface modules 130-1 and 130-2, respectively). User devices 110 may be controlled, programmed, and/or operated by users 140-1 and 140-2 (referred to herein collectively as "users 140" and generically as "user 140").

User device 110 may include one or more devices capable of storing/executing applications and sending/receiving information (e.g., data, broadband applications, etc.). User device 110 may include, for example, a personal computer, a computer workstation, a tablet computer, a smart phone, a laptop computer, a portable gaming system, or other types computation/communication devices.

Network 115 may include, for example, a local area network (LAN), a private network (e.g., a company intranet), a wide area network (WAN), a metropolitan area network (MAN), or another type of network that enables communication between user devices 110.

User device 110 may include one or more stored applications 120 with various functionalities, such as functionalities associated with provisioning, order processing, transactions management, social media, dictionary/reference, currency/mathematical conversions, travel, traffic, weather, sports, news, etc. In one implementation, user device 110 may store and execute a particular type of application 120 that requires information from another system or application 120. For example, application 120-1 may be a provisioning system that requests order information from an ordering system 120-2.

Flexible interface module 130 may include a software module that allows applications 120 to exchange information with each other. Flexible interface module 130 may be installed in both user devices 110 such that one flexible interface module 130 (e.g., flexible interface module 130-1) may communicate with another flexible interface module 130 (e.g., flexible interface module 130-2). Flexible interface module 130 may be included as part of the same container as its host application (e.g., application 120) and customized for that particular application to enable the host application to execute query commands from flexible interface module 130. In an exemplary implementation, flexible interface module 130 may be deployed in a Java 2 Enterprise Edition (J2EE) platform. As described further herein, each flexible interface module 130 may provide a user interface, such as a GUI or text-based interface, to enable users 140 (e.g., software developers) to write formatted queries and package the formatted queries into an invocation.

Each flexible interface module 130 may locally store respective formatted queries (e.g., associated with a corresponding application 120). Upon receiving a trigger from a user 140 (e.g., via the user interface) or from a local application 120, a local flexible interface module 130 (e.g., flexible interface module 130-1) may invoke the remote query on the other flexible interface module 130 (e.g., flexible interface module 130-2). The other flexible interface module 130 may execute the remote query and return an output value to the local flexible interface module 130. In one implementation, flexible interface module 130 may support a web service or another communication interface to enable machine-to-machine communications.

Users 140 may include developers who may be required to permit machine-to-machine communications between applications 120 residing on user devices 110. According to implementations described herein, use of flexible interface modules 130 may simplify software development and reduce a required level-of-effort to provide required communications from other systems without complex code changes to existing systems.

In operation, applications incorporating flexible interface modules 130 may exchange data using simplified instructions without requiring internal coding changes to local applications. Internal queries would not be exposed directly to external systems. Instead the internal queries can be encapsulated in an invocation. That is, a local application (e.g., application 120-1) can execute an external invocation in a remote application (e.g., application 120-2) by passing the invocation name/input variables; but the local application may not have visibility to the query in the remote system, since all the local application would know would be the invocation name, input parameters, and output parameters.

Although FIG. 1 shows example components of environment 100, in other implementations, environment 100 may contain fewer components, different components, differently arranged components, or additional components than depicted in FIG. 1.

Figure 2:
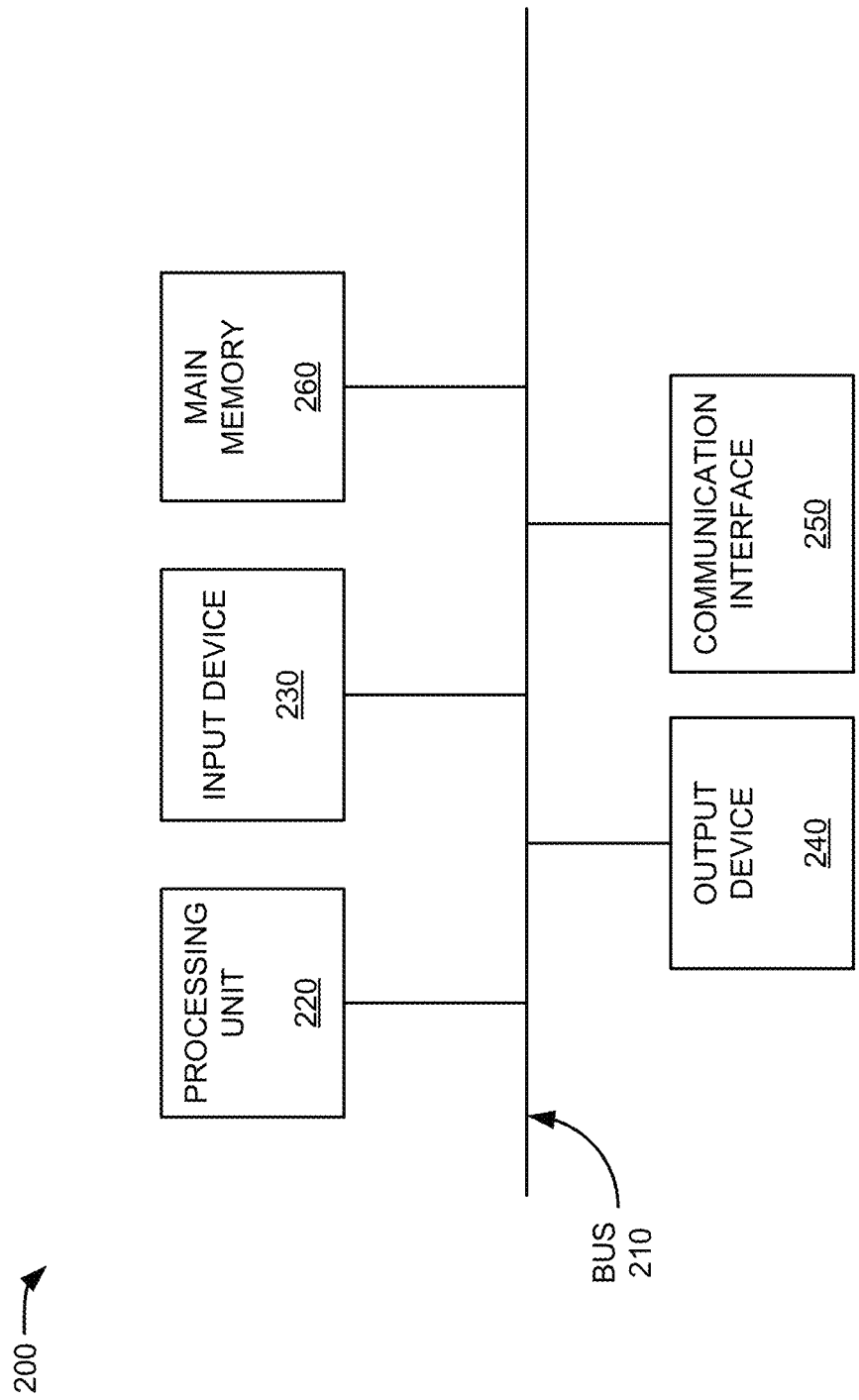
FIG. 2 is a diagram of exemplary components of a user device of FIG. 1.

FIG. 2 is a block diagram of exemplary components of a user device 110. User device 110 may include a bus 210, a processing unit 220, an input device 230, an output device 240, a communication interface 250, and a memory 260. User device 110 may include other components (not shown) that aid in receiving, transmitting, and/or processing data. Moreover, other configurations of components in user device 110 are possible.

Bus 210 may include a path that permits communication among the components of user device 110. Processing unit 220 may include any type of processor or microprocessor (or groups of processors or microprocessors) that interprets and executes instructions. In other embodiments, processing unit 220 may include an application-specific integrated circuit (ASIC), a field-programmable gate array (FPGA), or the like.

Input device 230 may include a device that permits a user to input information into user device 110, such as a keyboard, a mouse, a pen, a, a remote control, a touch-screen display, etc. Output device 240 may include a device that outputs information to the user, such as a display, a speaker, etc. Output device 240 may also include a vibrator to alert a user.

Input device 230 and output device 240 may allow the user to activate a particular service or application. Input device 230 and output device 240 may allow the user to receive and view a menu of options and select from the menu options, such as options included in a GUI. The menu may allow the user to define and/or select various functions or services associated with applications executed by user device 110.

Communication interface 250 may enable user device 110 to communicate with other devices and/or systems. Communication interface 250 may include a transmitter that may convert baseband signals to radio frequency (RF) signals and/or a receiver that may convert RF signals to baseband signals. Alternatively, communication interface 250 may include a transceiver to perform functions of both a transmitter and a receiver. Communication interface 250 may be coupled to an antenna for transmission and reception of the RF signals. Communications interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface for communicating with Bluetooth devices, a near-field communication (NFC) interface, etc. Communication interface 250 may implement a wireless communication protocol, e.g., LTE, GSM, CDMA, WCDMA, GPRS, EDGE, etc. Communications interface 250 may also receive, transmit and/or process digital or analog audio inputs/outputs and/or digital or analog video inputs/outputs.

Memory 260 may include a random access memory (RAM) or another type of dynamic storage device that may store information and instructions, e.g., an application, for execution by processing unit 220; a read-only memory (ROM) device or another type of static storage device that may store static information and instructions for use by processing unit 220; and/or some other type of magnetic or optical recording medium and its corresponding drive (e.g., a hard disk drive (HDD), flash drive, etc.), for storing information and/or instructions. Consistent with implementations described herein, memory 260 may include application 120 and flexible interface module 130.

As described herein, user device 110 may perform certain operations in response to processing unit 220 executing software instructions contained in a computer-readable medium, such as memory 260. A computer-readable medium may include a non-transitory memory device. A memory device may include space within a single physical memory device or spread across multiple physical memory devices. The software instructions may be read into memory 260 from another computer-readable medium or from another device via communication interface 250. The software instructions contained in memory 260 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of user device 110, in other implementations, user device 110 may contain fewer components, different components, differently arranged components, or additional components than depicted in FIG. 2. Alternatively, or additionally, one or more components of user device 110 may perform one or more other tasks described as being performed by one or more other components of user device 110.

Figure 3:
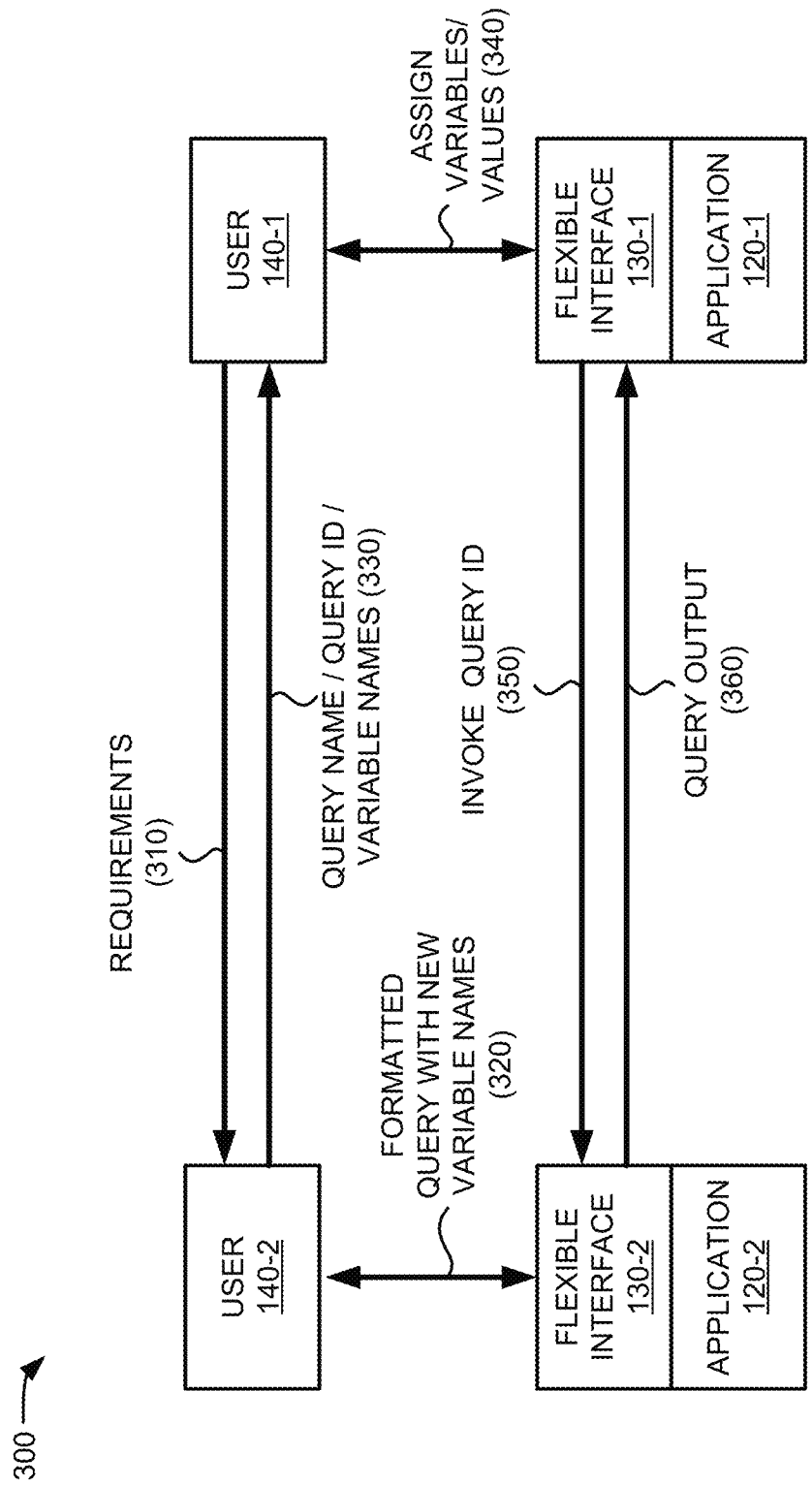
FIG. 3 is a diagram of exemplary communications within a portion of the network of FIG. 1.

FIG. 3 is a diagram of exemplary communications for a portion 300 of environment 100. As shown in FIG. 3, portion 300 may include applications 120-1 and 120-2, flexible interface modules 130-1 and 130-2, and users 140-1 and 140-2.

Applications 120, flexible interface modules 130, and users 140 may include features described above in connection with, for example, FIGS. 1 and 2.

Communications describe in connection with FIG. 3 represent a sample use case of a first application (e.g., application 120-1) being configured to obtain information from a second application (e.g., application 120-2) given certain information from application 120-1. As shown in FIG. 3, user 140-1 may provide requirements 310 to user 140-2 (e.g., via out-of-band communications, such as email, voice, etc.). Requirements 310 may include, for example, a description of the information needed from application 120-2.

User 140-2 may receive requirements 310 and may use flexible interface module 130-2 to write a formatted query 320 with new variable names. Formatted query 320 may be written, for example, using a GUI of flexible interface module 130-2 and may include new variables to reflect fields needed to meet requirements 310. It should be understood that a queries described herein (e.g., formatted query 320) are not limited to only retrieving data. Instead, a formatted query may include different types of Structured Query Language (SQL) statements that may include, for example, insert, delete, and/or update statements. Flexible interface module 130-2 may assign a query identifier (e.g., a unique string) to formatted query 320.

User 140-2 may provide the query identifier and the new variable names to user 140-1 (e.g., via out-of-band communications, such as email, voice, etc.), as indicated by reference number 330. User 140-1 may, in turn, supply the query identifier to flexible interface 130-1, as indicated by reference number 340. User 140-1 may also create (e.g., as prompted by flexible interface module 130-1) an invocation to run the query provided by communication 330.

When application 120-1 is ready to request/retrieve information from application 120-2, application 120-1 may invoke the query identifier or query name using flexible interface 130-1, as indicated by reference number 350. In addition to direct user inputs, the query may be invoked by automated applications running on user device 110, as well as in cases where the user input is indirectly received (such as order data input). For example, in an existing order flow, an invocation can be dynamically created and plugged in to use unused data elements in the order. Application 120-1 may supply the variable names (as defined by user 140-2) and associated values (obtained from execution of application 120-1, user 140-1, or another application) to flexible interface 130-1, which in turn passes them to flexible interface 130-2.

Flexible interface 130-2 may cause application 120-2 to run the requested query using the variables and values provided by flexible interface 130-1. Application 120-2 may provide the query results to flexible interface 130-2, which in turn may send query output 360 to flexible interface 130-1. Flexible interface 130-1 may forward query output 360 to application 120-1. Application 120-1 may then perform additional processing based on the received query results 360. Additional processing may include, for example, running an additional local query to integrate the query output into application 120-1.

Figure 4:
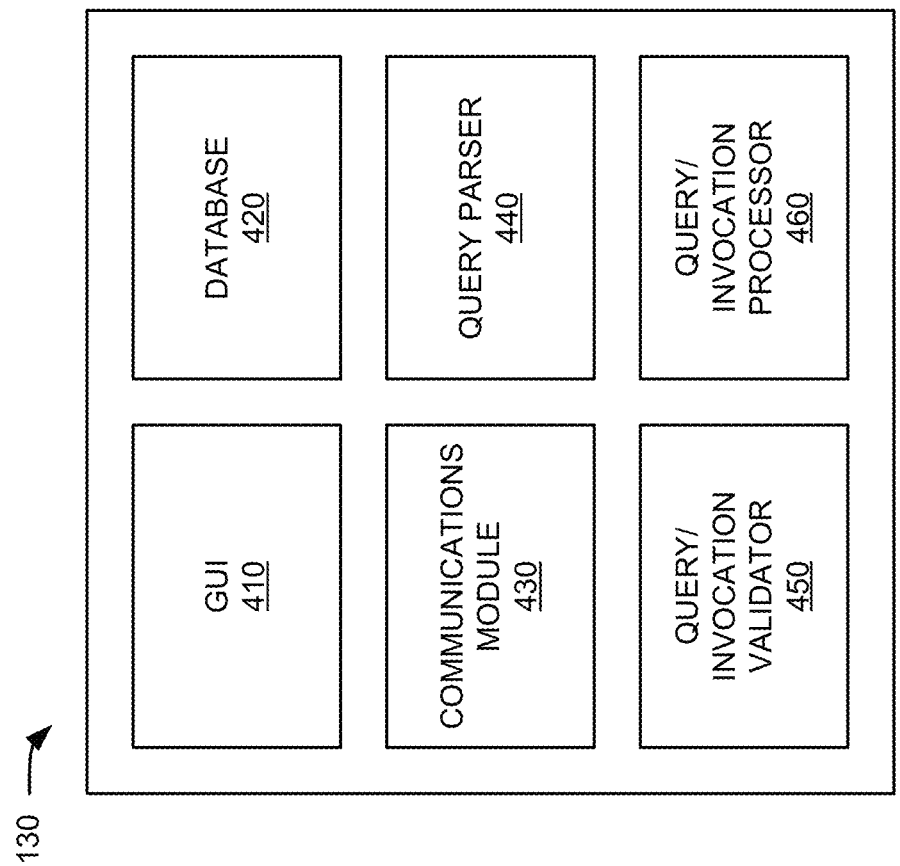
FIG. 4 is a diagram of exemplary functional components of the flexible interface module depicted in FIG. 1.

FIG. 4 is a diagram of exemplary functional components of flexible interface module 130. In one implementation, the functions described in connection with FIG. 4 may be performed by one or more components of user device 110 illustrated in FIG. 2. As shown in FIG. 4, flexible interface module 130 may include a GUI 410, a database 420, a communications module 430, a query parser 440, a query validator 450, and a processor 460.

Figure 5:
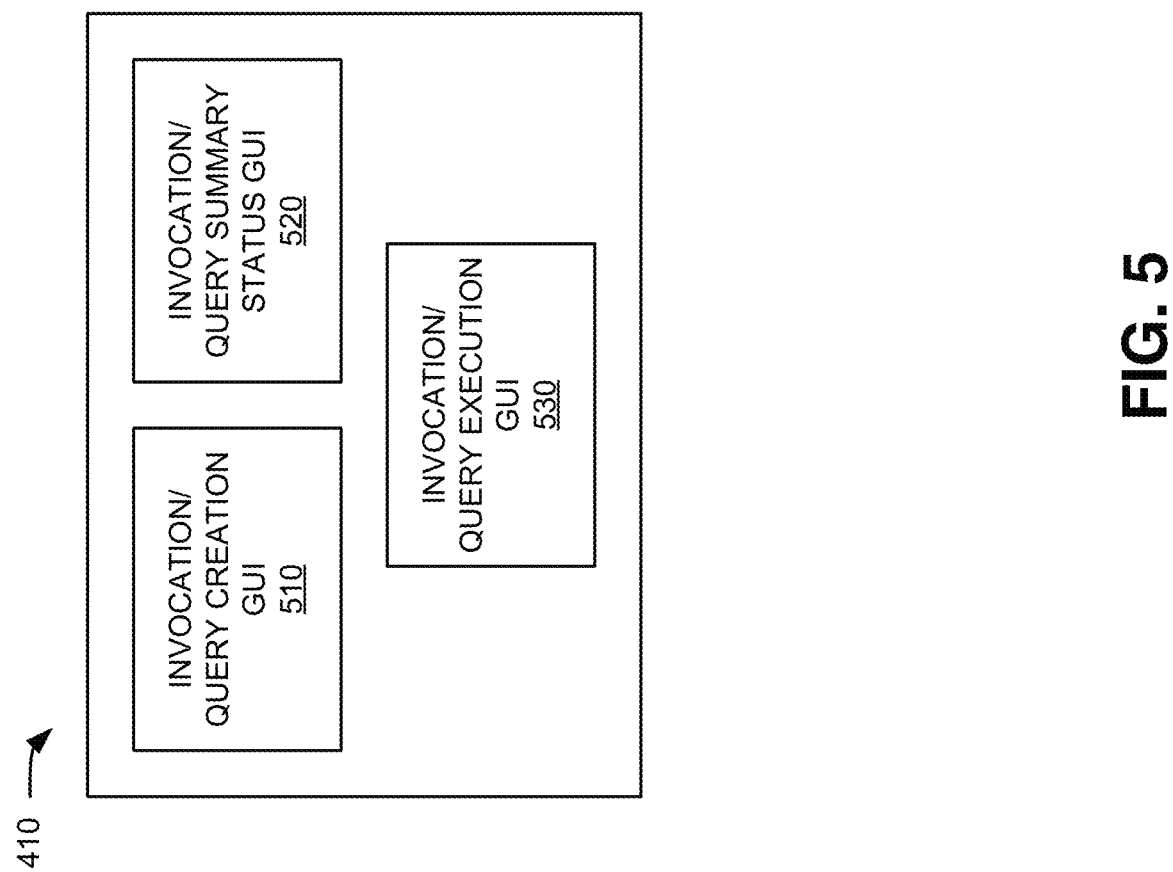
FIG. 5 is a diagram of exemplary components of a graphical user interface of FIG. 4.

GUI 410 may provide a user interface to create and/or edit queries, create/edit invocations, execute queries/invocations, and present status information for one or more queries/invocations. As shown in FIG. 5, in one implementation, GUI 410 may include an invocation/query creation GUI 510, an invocation/query summary status GUI 520, and an invocation/query execution GUI 530.

Invocation/query creation GUI 510 may provide a user interface to allow writing, editing, and/or deleting of formatted queries. Invocation/query creation GUI 510 may solicit user input to generate query names and/or generate unique identifiers. In one implementation, invocation/query creation GUI 510 may provide a distinct set of input screens for invocations and another distinct set of input screens for queries. Invocation/query creation GUI 510 may allow a user to specify the nature of the query (e.g., internal/external; number of rows of data expected to be returned (e.g., 1, >1, 0 rows); number of times query can be executed in a day; a source system which to execute the query, etc.). Each invocation may include one or more queries that may be ordered in a sequence defined by a user.

In one implementation, invocation/query creation GUI 510 may provide one or more input screens to collect invocation information from a user (e.g., user 140). For example, invocation/query creation GUI 510 may collect multiple local query identifiers/names, or invocation names, one after the other. Invocation/query creation GUI 510 may allow users to change of the order of running the queries. Invocation/query creation GUI 510 may also collect an owning system name (e.g., of a host application 120 that performs a query locally) for the query or invocation. The owning system name may be related to an internal invocation/query or an external query/invocation. Invocation/query creation GUI 510 may also solicit whether each query/invocation is expected to return multiple records. If multiple records are expected, invocation/query creation GUI 510 may also solicit a listing order for the multiple records. Invocation/query creation GUI 510 may also solicit whether the results of the query/invocation will be iterated by subsequent queries/invocations. The input screen(s) of invocation/query creation GUI 510 may also solicit, for example, whether each input is a query or an invocation; the number of times an invocation can be invoked by a given external application (e.g., in an hour, day, week, etc.); and a list of external system names/acronyms that can be used to trigger the invocation.

Invocation/query creation GUI 510 may permit several different types of invocation operations. For example, invocation/query creation GUI 510 may allow a user to conduct a search by Invocation Name, by Invocation ID, or by System Name. Invocation/query creation GUI 510 may also allow a user to update an existing invocation (e.g., alter the list and sequence of query/invocations) or delete an invocation altogether.

In another implementation, invocation/query creation GUI 510 may provide one or more input screens to collect query information from a user (e.g., user 140). For example, invocation/query creation GUI 510 may solicit user input to create a query along with other supporting data. The input screen may solicit for example, a formatted query, a list of input parameters, and a list of output parameters. Each input/output parameter may be listed as a single parameter or multiple parameters. Invocation/query creation GUI 510 may also solicit user input concerning a number of times a query can be run and/or an invocation name(s) associated with the query. In some instances a query can be created without an invocation name. Additionally, or alternatively, the same query can be present in multiple invocations triggered locally or externally.

Invocation/query creation GUI 510 may permit several different types of query operations. For example, invocation/query creation GUI 510 may allow a user to conduct a search by Query Name, Query ID, or System Name. Invocation/query creation GUI 510 may also allow a user to update an existing query (e.g., change properties of a query) or delete a query altogether.

Invocation/query summary status GUI 520 may provide a user interface to present information about invocation transactions and/or query transactions. Invocation/query summary status GUI 520 may provide, for example, a status of invocation/query execution results generally, a status invocations/queries invoked/executed in a given timeframe, or statistics related to particular invocations/queries and/or timeframes.

In one implementation, invocation/query summary status GUI 520 may include a user interface screen to allow a user to inquire about invocation transactions. The user interface screen may allow a user to search on running invocations with an invocation transaction identifier. For example, a simple search by invocation name or invocation identifier will show all running invocations. For running invocations, invocation/query summary status GUI 520 may show the real-time progress of each particular invocation. For example, if there are ten queries and two invocations, the state of each query and invocation will be displayed. Once all the queries/invocations are complete, output parameters can be populated. The user interface screen may also allow a user to search on completed invocations by name, invocation transaction identifier, and/or time frame. Search results may be displayed with associated detail for each completed invocation.

In another implementation, invocation/query summary status GUI 520 may include a user interface screen to allow a user to inquire about query transactions. Invocation/query summary status GUI 520 may include a user interface screen to allow a user to inquire about query transactions. For example, invocation/query summary status GUI 520 may allow users to search on running queries with any of an invocation transaction identifier, an invocation name, a query identifier, or a query name. For running queries, invocation/query summary status GUI 520 may show the real-time progress of the query and the query results. For completed queries, invocation/query summary status GUI 520 may allow a user to sort by name, query transaction identifier, or time frame. Search results may be displayed with associated detail for each completed query.

Invocation/query execution GUI 530 may provide a user interface to initiate an invocation/query or to configure automatic initiation of an invocation/query. Invocation/query execution GUI 530 may allow local or remote queries/invocations to be invoked with appropriate variables and values. In one implementation, invocation/query execution GUI 530 may display final and intermediate results for each query.

In one implementation, invocation/query execution GUI 530 may include a user interface screen to allow a user to run invocations with input and output parameters. Invocation/query execution GUI 530 may display a list of available internal/external invocations and allow for searches on the invocations. When a user selects a particular invocation, invocation/query execution GUI 530 will display the list of input parameters with an option to input as per the data type. Invocation/query execution GUI 530 may include a submit option, the selection of which will result in execution of the invocation. Selection of a submit option can also cause invocation/query execution GUI 530 to generate an invocation transaction identifier. After the selected invocation is executed, invocation/query execution GUI 530 may display the result to the user using GUI 530. If the invocation involves multiple queries/transactions, invocation/query execution GUI 530 may present of status of each query/transaction in real time.

In one implementation, invocation/query execution GUI 530 may include a user interface screen to allow a user to run queries with input and output parameters. Invocation/query execution GUI 530 may display a list of available internal/external queries and allow for searches on the queries. When a user selects a particular query, invocation/query execution GUI 530 will display the list of input parameters for the query with an option to input as per the data type. Invocation/query execution GUI 530 may include a submit option, the selection of which will result in execution of the query. After the selected query is executed, invocation/query execution GUI 530 may display the result to the user using the GUI.

Returning to FIG. 4, flexible interface module 130 may include database 420. Database 420 may include a variety of tables to reflect stored queries/invocations and results of actual data exchanges between applications 120. Each of the tables may be implemented as a part of a relational database management system (RDBMS) or another data structure (e.g., hash table, a linked list, etc.). Features of database 420 are described further in connection with FIG. 6.

Figure 6:
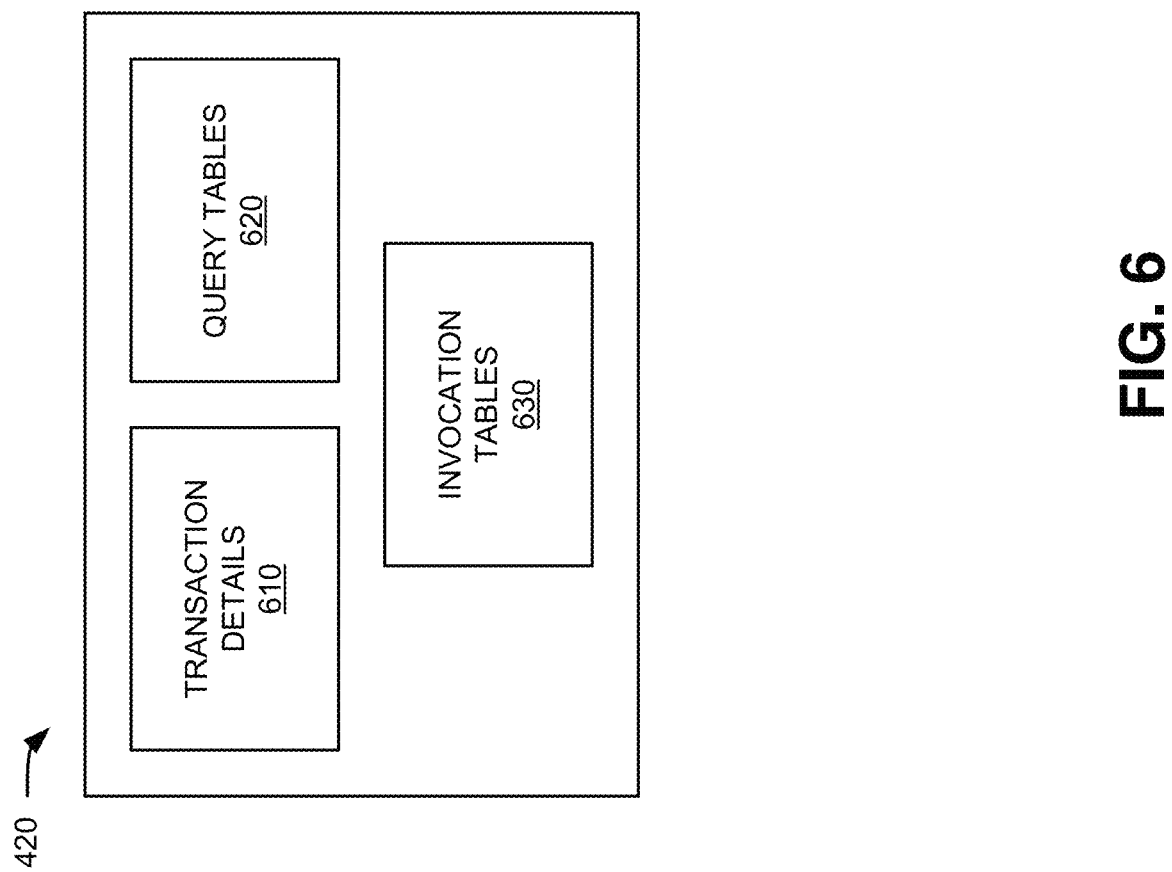
FIG. 6 is a diagram of exemplary components of a database of FIG. 4.

As shown in FIG. 6, database 420 may include transaction details table 610, query tables 620, and invocation tables 630. Transaction details table 610 may include transaction information for inbound and/or outbound query execution. In one implementation, transaction details table 610 may include separate sections for inbound queries (e.g., queries that may be executed locally) and outbound queries (e.g., queries that may be executed remotely). For inbound queries, transaction details table 610 may include a list of actual queries executed and the query results. The listed inbound queries may include the variables and values used to construct each query and any associated invocation details. For outbound queries, transaction details table 610 may include a list of the actual query name and/or query identifier that has been invoked and the query results. The listed outbound queries may include the variables and values sent with each query, the target system, and any associated invocation details.

Figure 7:
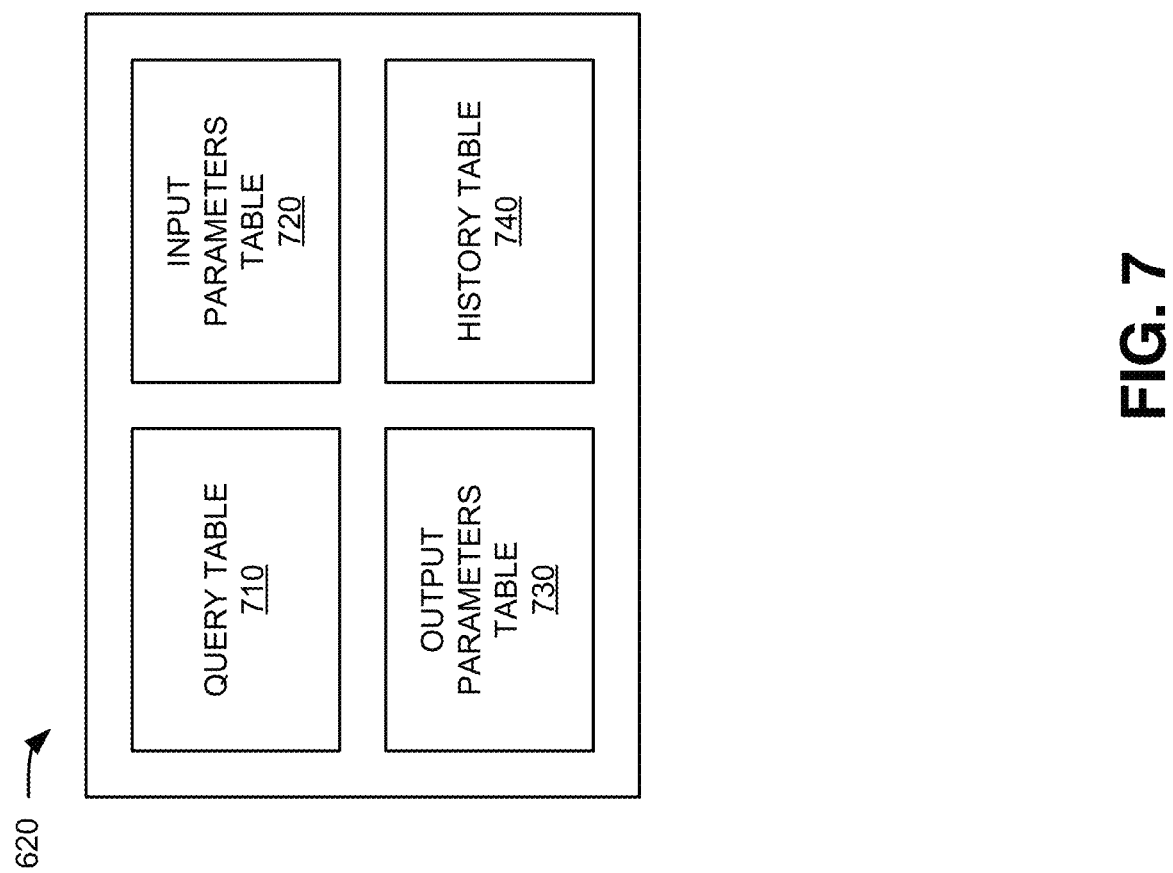
FIG. 7 is a diagram of exemplary components of query tables of FIG. 6.

Query tables 620 may generally include tables related to particular queries. Features of query tables 620 are described further in connection with FIG. 7. As shown in FIG. 7, query tables 620 may include a query table 710, an input parameters table 720, an output parameters table 730, and a history table 740.

Query table 710 may include format information for each available query. Query table 710 may include a variety of fields for each query. Fields for query table 710 may include, for example, a query identifier, a query name, the actual formatted query, an owning system for the query, expected results (e.g., single/multi instance), a query version, a date (e.g., of creation/modification of the query), and a user (e.g., person who created/modified the query).

Input parameters table 720 may include fields relating to input parameters for particular queries. Each query can have multiple input parameters. Fields for input parameters table 720 may include, for example, a query identifier, an input parameter (e.g., variable name, length, etc.), a data type (e.g., integer, character string, etc.), and a format.

Output parameters table 730 may include fields relating to output parameters for particular queries. Each query can have multiple output parameters. Fields for output parameters table 730 may include, for example, a query identifier, an output parameter, a data type, and a format.

History table 740 may include a cumulative data structure of query results, input values, times, or other information from any of query table 710, input parameters table 720, and output parameters table 730. In one implementation, history table may include a particular size or date range that may automatically overwrite older data.

Figure 8:
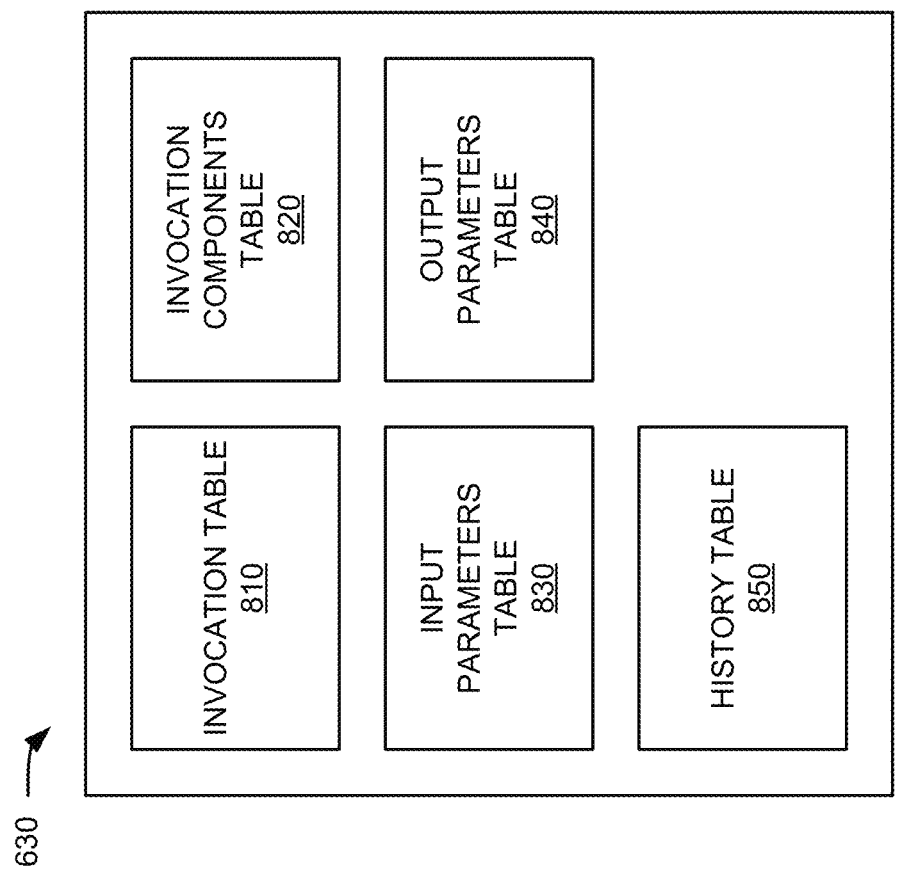
FIG. 8 is a diagram of exemplary components of invocation tables of FIG. 7.

Returning to FIG. 6, invocation tables 630 may generally include tables related to particular invocations. Features of invocation tables 630 are described further in connection with FIG. 8. As shown in FIG. 8, invocation tables 630 may include an invocation table 810, invocation components 820, an input parameters table 830, an output parameters table 840, and a history table 850.

Invocation table 810 may include format information for each available invocation. Invocation table 810 may include a variety of fields for each invocation. Fields for invocation table 810 may include, for example, an invocation identifier, an invocation name, an external/internal indicator (e.g., "e" or "i"), an owning system for the invocation, expected results (e.g., single/multi instance), an invocation version, a date (e.g., of creation/modification of the invocation), and a user (e.g., person who created/modified the invocation).

Invocation components table 820 may include component information for each available invocation. Fields for invocation components table 820 may include, for example, a master invocation identifier, a query identifier (e.g., associated with the master invocation identifier), an invocation identifier (e.g., for any sub-invocations associated with the master invocation identifier), a component type (e.g., either "invocation" or "query"), a sequence number (e.g., designating an order of execution within the master invocation), a date (e.g., of creation/modification of the master invocation), and a user (e.g., person who created/modified the master invocation).

Input parameters table 830 may include fields relating to input parameters for particular invocations. Each invocation can have multiple input parameters. Fields for input parameters table 830 may include, for example, an invocation identifier, an input parameter, a data type, and a format.

Output parameters table 840 may include fields relating to output parameters for particular invocations. Each invocation can have multiple output parameters. Fields for output parameters table 840 may include, for example, an invocation identifier, an output parameter, a data type, and a format.

History table 850 may include a cumulative data structure of invocation results, triggers, times, or other information from any of invocation table 810, invocation components table 820, input parameters table 830, and output parameters table 840. In one implementation, history table may include a particular size or date range that may automatically overwrite older data.

Returning to FIG. 4, flexible interface module 130 may include communications module 430. Communications module 430 may manage communications and session management between flexible interface modules 130. For example, communications module 430 may permit one flexible interface module 130 to request execution of an external query on another flexible interface module 130. Similarly, communications module 430 may permit one flexible interface module 130 to provide output from the external query to the other flexible interface module 130 In one implementation, communication module 430 may implement a web service interface and/or Java application programming interface (API).

Query parser 440 may translate a formatted query (e.g., received from GUI 410) into specific instructions for an application (e.g., application 120) to perform the query function.

Query/Invocation validator 450 may validate a query or invocation created by a user. Query/Invocation validator 450 may verify user input to ensure consistency with input/output parameters. For example, in any given invocation, a query's or a sub-invocation's input parameters must also be one of the invocation's input parameters, or any of the predecessor query's output parameters, are any of the predecessor invocation's output parameters.

Query/invocation processor 460 may manage execution of local/remote queries and invocations based on local/inbound triggers. For example, query/invocation processor 460 may initiate a particular query upon receiving an external query request from a remote flexible interface module 130. Additionally, or alternatively, query/invocation processor 460 may initiate an invocation in response to local user input or receipt of a particular input variable value. Query/invocation processor 460 may process query results and/or triggers subsequent actions based on the query results. Query/invocation processor 460 may also support creation and management of query/invocation inventory (e.g., for database 420).

Figure 9A:
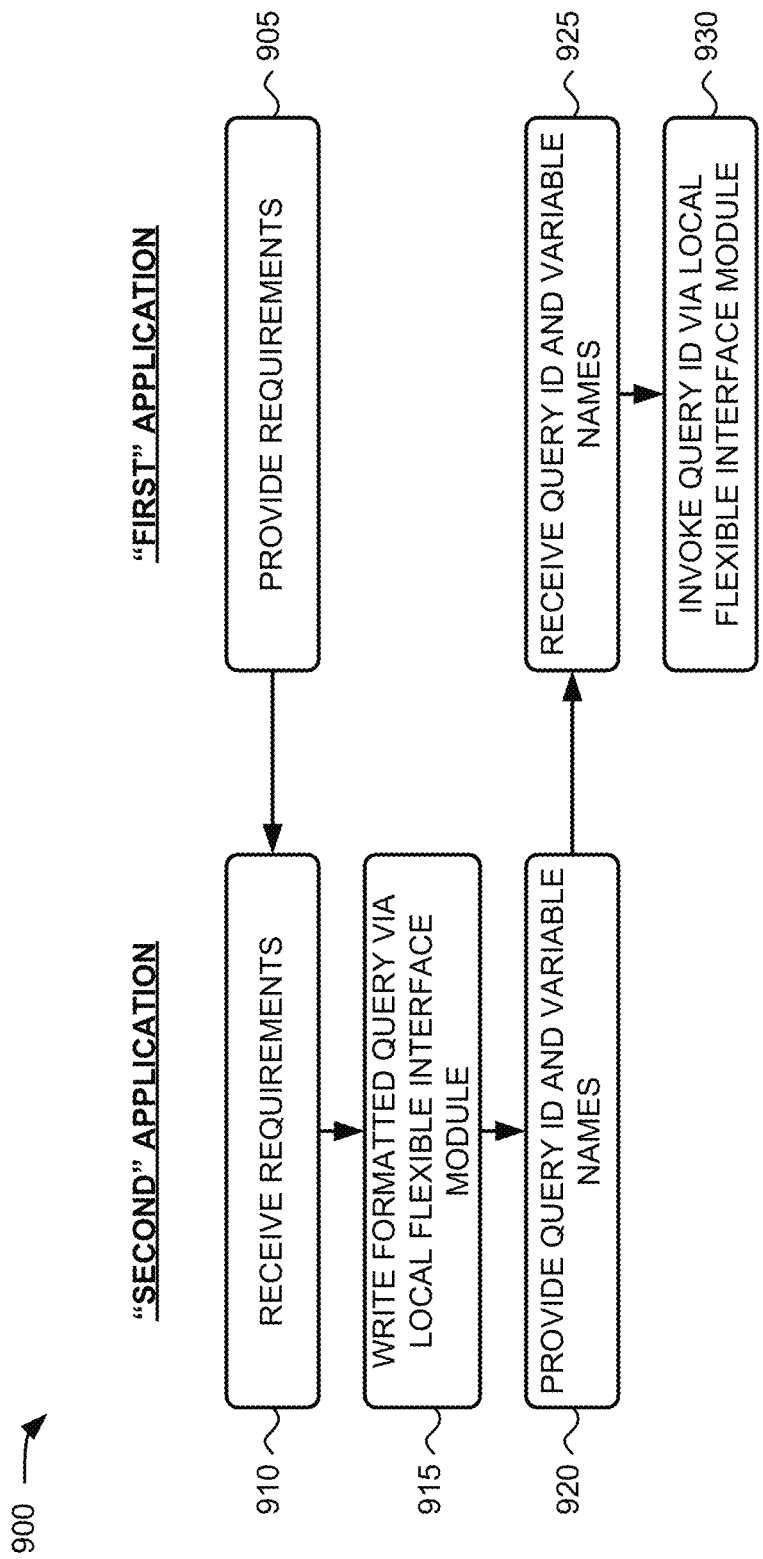
FIGS. 9A and 9B are flow charts of an example process for using a flexible interface module according to implementations described herein.
Figure 9B:
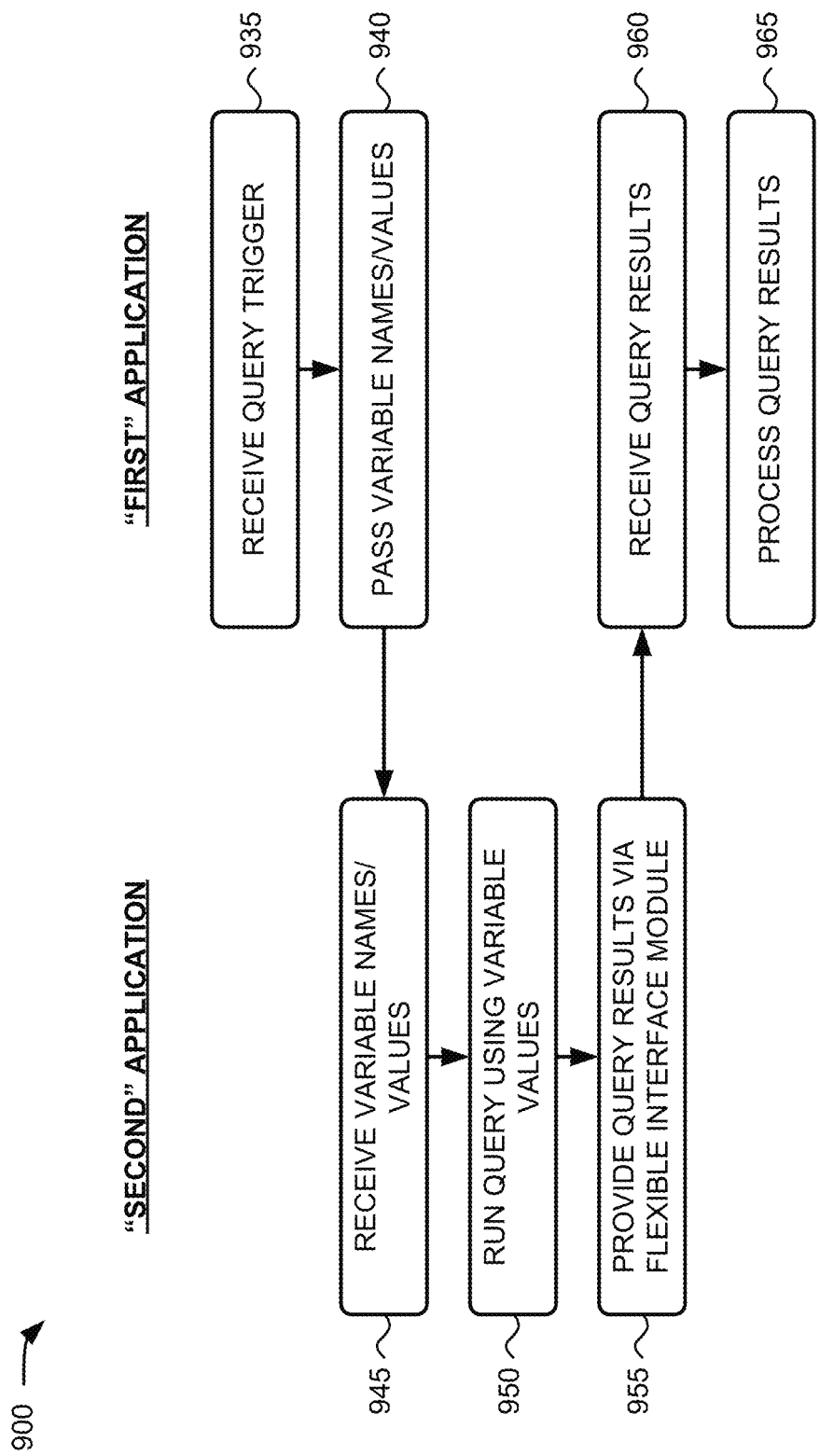
Figure 10A:
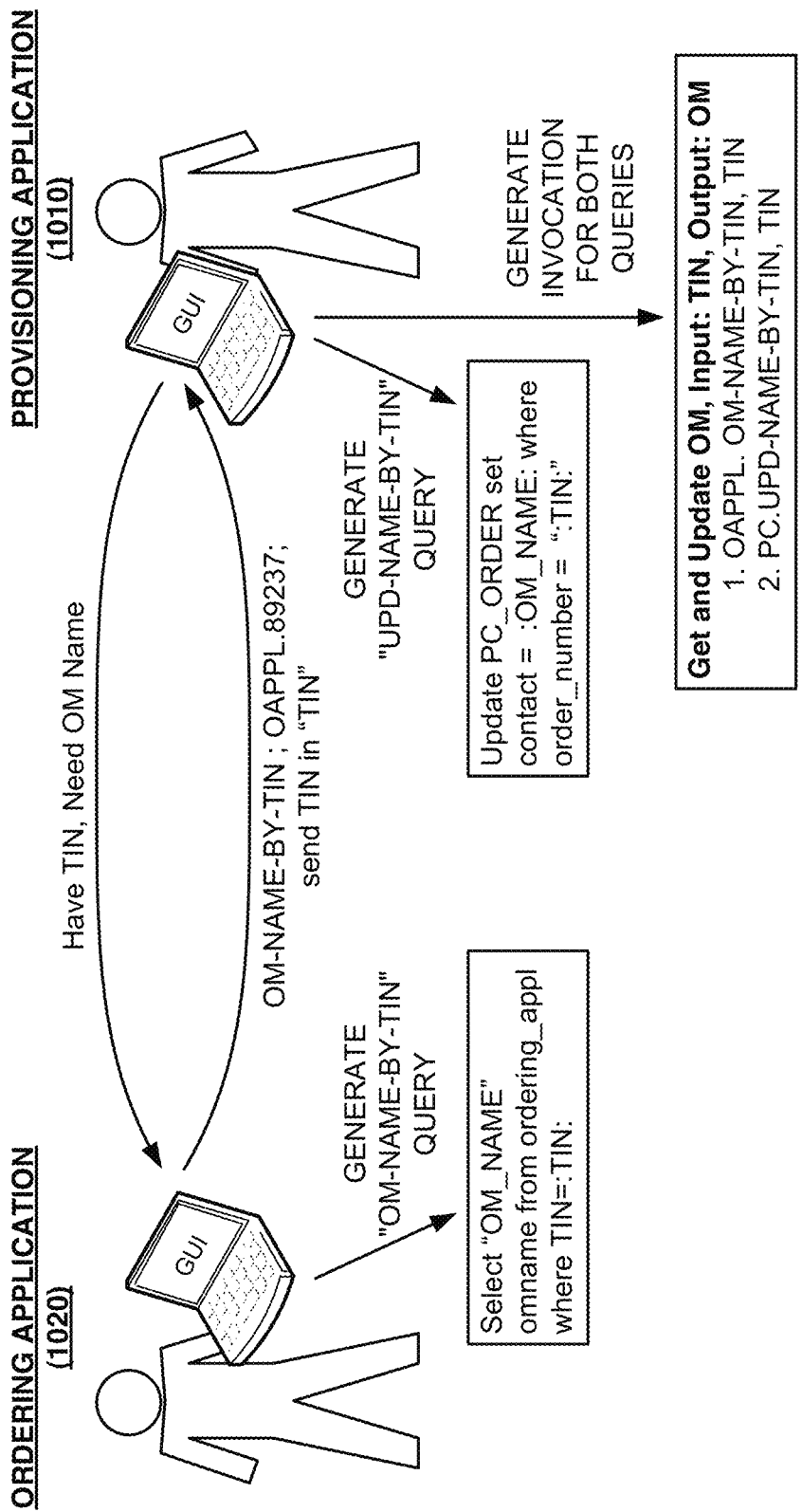
FIGS. 10A and 10B are illustrations of communications for a particular use case that may correspond to the example process of FIGS. 9A and 9B.
Figure 10B:
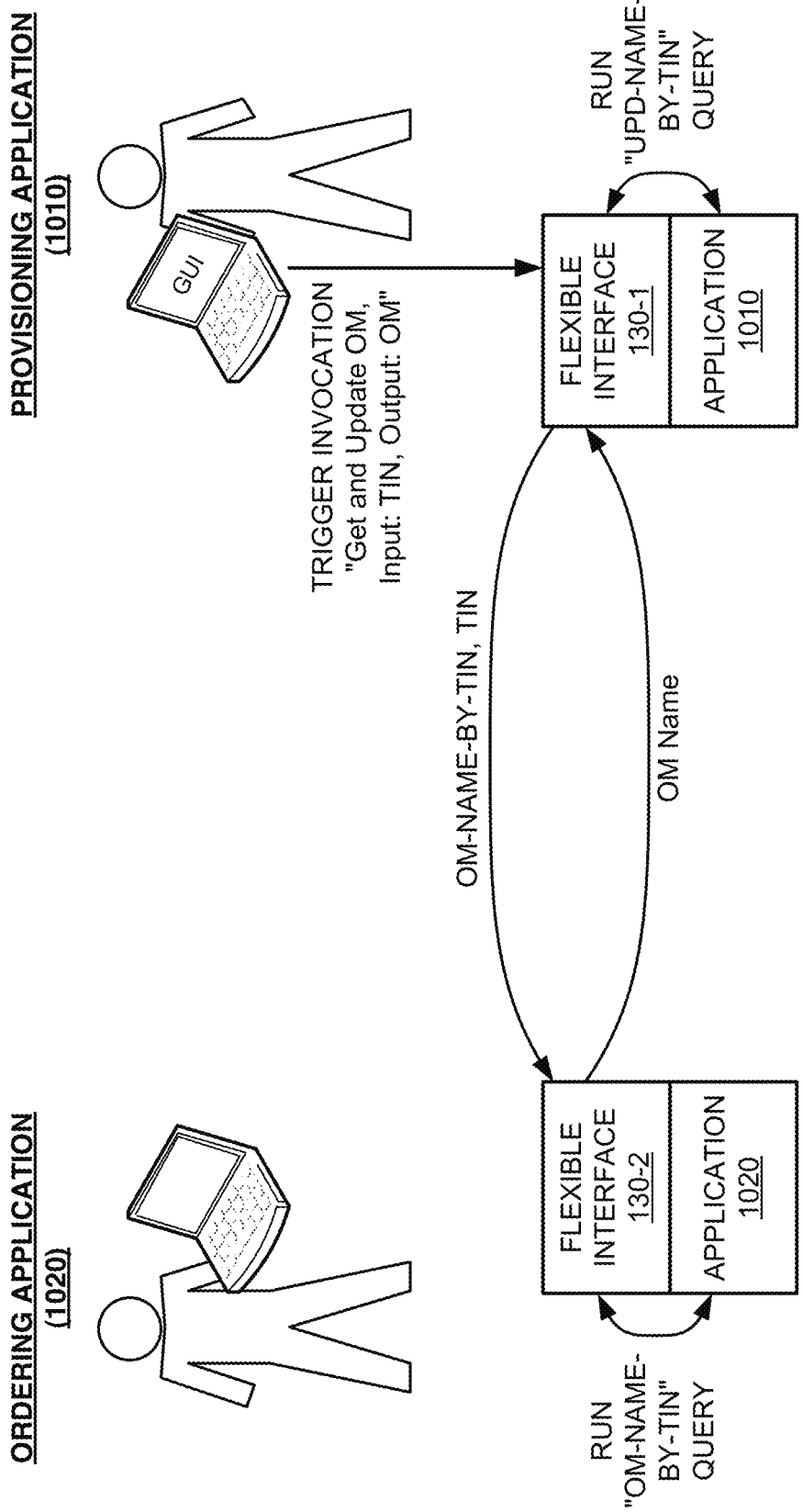

FIGS. 9A and 9B are flow charts of an exemplary process 900 for using a flexible interface module according to implementations described herein. FIGS. 10A and 10B provide illustrations of communications for a particular use case that may correspond to the steps of process 900. In one implementation, process 900 may be performed by user devices 110 executing applications (e.g., applications 120) that each includes a flexible interface module (e.g., flexible interface module 130). In another implementation, some or all of process 900 may be performed by another device or group of devices, including or excluding user devices 110. Examples illustrating steps of FIGS. 9A and 9B are included in FIGS. 10A and 10B.

Assume in FIGS. 10A and 10B that a provisioning application 1010, given a particular tracking information number (TIN), is required to associate a particular order manager (OM) name with the TIN. Assume further that the data to cross reference OM names associated with TINs reside on another system, accessed by an ordering application 1020.

As illustrated in FIG. 9A, process 900 may include providing, by a first software developer for a first application, requirements for an exchange between remote systems (block 905); receiving, by a second software developer for a second application, the requirements (block 910); and writing a formatted query via a local flexible interface module (block 915). For example, in the scenario shown in connection with FIG. 10A, a developer of provisioning application 1010 may send exchange requirements to provide an OM name given a TIN (e.g., "have TIN, need OM name"). The developer of ordering application 1020 may receive the exchange requirements and, in response may write a formatted query using a GUI (e.g., invocation/query creation GUI 510) of flexible interface module 130-2. As shown in FIG. 10, the query may be in the form of "Select "OM_NAME" omname from ordering_appl where TIN=:TIN:" where OM_NAME is variable for an order manager's name and where ":TIN:" represents a variable for tracking information number. The developer of ordering application 1020 may select a name for the query (i.e., "OM-NAME-BY-TIN"), and flexible interface module 130-2 may assign a unique identifier (i.e., "oapp1.89237").

Returning to FIG. 9A, process 900 may include providing, by the second software developer for the second application, a query identifier and variable names (block 920). For example, in the scenario shown in connection with FIG. 10A, the developer of ordering application 1020 may send to the developer of provisioning application 1010 the new query name (i.e., "OM-NAME-BY-TIN") and/or the unique identifier (i.e., "oapp1.89237"), along with the variable name assigned to the source variable (e.g., "TIN") for the new query.

As further shown in FIG. 9A, process 900 may include receiving, by the first software developer for the first application, the query identifier and variable names (block 925), and invoking, by the first developer for the first application, the query via a local flexible interface module (block 930). For example, in the scenario shown in connection with FIG. 10A, the developer of provisioning application 1010 may receive the new query name, unique identifier, and variable name. In turn, the developer of provisioning application 1010 may generate an invocation to execute the query. In the example of FIG. 10A, provisioning application 1010 may require an additional query to process information received from ordering application 1020. The developer of provisioning application 1010 may write a formatted query using a GUI (e.g., invocation/query creation GUI 510) of flexible interface module 130-1. As shown in FIG. 10A, the query may be in the form of "Update PC_ORDER set contact=:OM_NAME: where order_number=":TIN:"" where PC_ORDER represents a data set to associate a TIN with the OM name. The developer of provisioning application 1010 may select a name for the query (i.e., "UPD-NAME-BY-TIN"), and flexible interface module 130-2 may assign a unique identifier (not shown).

Still referring to FIG. 10A, the developer of provisioning application 1010 may write an invocation using the GUI of flexible interface module 130-1. The invocation may incorporate both the OM-NAME-BY-TIN query (e.g., to retrieve the OM name from application 1020) and the UPD-NAME-BY-TIN query (e.g., to incorporate the retrieved OM name into application 1010). As shown in FIG. 10A the invocation (i.e., "Get and Update OM, Input: TIN, Output: OM") may invoke the two queries by indicating a sequence (i.e., "1." and "2."), a source (i.e., "OAPPL." for the external query by application 1020, and "PC." for the internal query by application 1010), a query name (i.e., "OM-NAME-BY-TIN" and "UPD-NAME-BY-TIN"), and the variable name (i.e., "TIN").

Referring to FIG. 9B, the flexible interface module of the first application may receive a query trigger (block 935) and may pass the variable names and values for the query to the flexible interface module of the second application (block 940). For example, in the scenario shown in connection with FIG. 10B, the developer of provisioning application 1010 may trigger execution of the queries "OM-NAME-BY-TIN" and "UPD-NAME-BY-TIN" using a GUI (e.g., invocation/query execution GUI 530) of flexible interface module 130-1. For example, application 1010 may be configured to trigger the invocation "Get and Update OM, Input: TIN, Output: OM" upon receiving a new TIN. In response to the trigger, flexible interface module 130-1 may initiate the first query in the invocation sequence (i.e., "OM-NAME-BY-TIN") by sending the query name and the new TIN value to flexible interface 130-2.

Referring back to FIG. 9B, the flexible interface module of the second application may receive the variable names and values for the query (block 945), may run the query using the variable values (block 950), and may provide the query results via the flexible interface module (block 955). For example, in the scenario shown in connection with FIG. 10B, flexible interface module 130-2 may receive the query name (i.e., "OM-NAME-BY-TIN") and the value for the new TIN. Flexible interface 130-2 may communicate with application 1020 to execute the "OM-NAME-BY-TIN" query and obtain an operations manager's name that corresponds to the TIN value. Flexible interface 130-2 may communicate with flexible interface 130-1 to provide the query result (i.e., "OM name") to application 1010.

Referring again to FIG. 9B, the flexible interface module of the first application (e.g., flexible interface module 130-1) may receive the query results (block 960), and may process the query results (block 965). For example, in the scenario shown in connection with FIG. 10B, flexible interface module 130-1 may receive the OM name and may initiate the second query in the invocation sequence (i.e., "UPD-NAME-BY-TIN"). Flexible interface 130-1 may communicate with application 1010 to locally execute the "UPD-NAME-BY-TIN" query to update a local table with the operations manager's name that corresponds to the TIN value.

While examples described herein have included a simple query with a single variable, in other implementations a formatted query can have more than one variable name as an input and provide more than one element/records as the output. Additionally, the output of one query/invocation can be used by subsequent queries/invocations.

Systems and/or methods described herein may provide, by an interface module of a first application, a user interface to solicit user input for a query, wherein the user input solicited by the user interface includes a formatted query, a query name, and an input variable name. The systems and/or methods may store, in a memory associated with the first application, the formatted query, the query name, and the input variable name. The systems and/or methods may receive, from an interface module of a second application, a request to execute the formatted query, wherein the request includes the query name and an input value associated with the input variable name, and may execute, by the first application, the query to obtain an output value based on the input value. The systems and/or methods may send, by the interface module of the first application, the output value to the interface module of the second application. The systems and/or methods may simplify a development and testing cycle for exchanging data between disparate systems in, for example, an enterprise environment.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described in connection with FIGS. 9A and 9B, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
providing, by an interface module of a first application, a user interface to solicit user input for configuring a query, wherein the user input solicited by the user interface includes a formatted query, a query name, and an input variable name;
receiving, from a user and by the interface module of the first application, the user input for configuring the query;
storing, in a memory associated with the first application, the formatted query, the query name, and the input variable name;
receiving, by the interface module of the first application and as a machine-to-machine communication from an interface module of a second application, a request to execute the formatted query, wherein the second application is different than the first application, and wherein the request includes the query name and an input value associated with the input variable name;
forwarding, to the first application and by the interface module of the first application, the input value;
executing, by the first application, the formatted query to obtain an output value based on the input value;
receiving, from the first application and by the interface module of the first application, the output value based on the input value: and
sending, by the interface module of the first application and as a machine-to-machine communication, the output value to the interface module of the second application.

2. The method of claim 1, further comprising:
providing, by the interface module of the first application, another user interface to present a status of the query.

3. The method of claim 1, wherein storing the formatted query, the query name, and the input variable name includes:
storing the formatted query, the query name, and the input variable name in a data structure including other queries.

4. The method of claim 1, further comprising:
validating, by the interface module of the first application, the formatted query.

5. The method of claim 1, further comprising:
assigning, by the interface module of the first application, a unique identifier for the formatted query.

6. The method of claim 1, further comprising:
receiving, by the interface module of the first application and from the user, requirements for the query to supply information from the interface module of the first application to the interface module of the second application.

7. The method of claim 1, further comprising:
providing, to the interface module of the second application, the query name and the input variable name.

8. The method of claim 1, wherein the interface module of the second application has no visibility of the formatted query.

9. A non-transitory computer-readable medium, including instructions executable by at least one processor, the non-transitory computer-readable medium comprising one or more instructions for:
providing a user interface to solicit user input for configuring an invocation, wherein the user input solicited by the user interface includes a name of an external query, associated with a remote application, to be executed and an input variable name for the external query;
receiving, from a user, the user input to configure the invocation;
storing, in a memory, the invocation with the name of the external query and the input variable name for the external query;
receiving, from a local application, a trigger to launch the invocation, wherein the trigger includes an input value for the external query;
executing, in response to receiving the trigger, the invocation, wherein executing the invocation includes providing, as a machine-to-machine communication to an interface module for the remote application, a request to execute the external query;
receiving, as a machine-to-machine communication from the interface module for the remote application and based on the request to execute the external query, an output value for the external query; and
processing the output value.

10. The non-transitory computer-readable medium of claim 9, further comprising one or more instructions for:
providing another user interface to solicit user input for an internal query associated with the local application, wherein the user input solicited by the other user interface includes a formatted query for the local application, a query name, and an input variable name for the internal query; and
storing, in the memory, the internal query.

11. The non-transitory computer-readable medium of claim 9, further comprising one or more instructions for:
providing a user interface to present a status of one or more of the external query and the invocation.

12. The non-transitory computer-readable medium of claim 9, wherein the request to execute the external query includes the name of the external query and the input value associated with the input variable name.

13. The non-transitory computer-readable medium of claim 9, wherein processing the output value includes executing an internal query to associate the output value with the local application.

14. The non-transitory computer-readable medium of claim 9, wherein the invocation further includes a source application for the external query.

15. The non-transitory computer-readable medium of claim 9, wherein the trigger to launch the invocation includes:
direct input from the user,
indirect input from the user, or
an automated action by an application.

16. The non-transitory computer-readable medium of claim 9, wherein the invocation includes multiple queries, including the external query, and wherein the invocation includes a sequence number for each of the multiple queries.

17. A method, comprising:
receiving, by a first interface module of an application on a first computing device, input to configure an invocation, wherein the input to configure the invocation includes a name of the invocation, and an input variable name of a query to be executed;
generating, by the first interface module, the invocation based on the input to configure the invocation;
storing, in a memory associated with the first computing device, the invocation with the name of the invocation and the input variable name;
receiving, by the first interface module of the first computing device, a trigger to launch the invocation;

providing, as a machine-to-machine communication to a second interface module of an application on a second computing device and based on the trigger, a request to execute the invocation, wherein the request includes the name of the invocation and an input value associated with the input variable name;

receiving, as a machine-to-machine communication from the second interface module of the second computing device and based on the input value, an output value from the query; and processing, by the first interface module of the first application computing device, the output value.

18. The method of claim 17, wherein processing the output value includes:

applying the output value as an input variable value for another query.

19. The method of claim 17, further comprising:

validating, by the first interface module of the first computing device, the invocation.

20. The method of claim 17, further comprising:

providing, by the first interface module of the first computing device, a user interface to present a status of the invocation.

* * * * *